United States Patent

Cooper et al.

[11] Patent Number: 6,008,867
[45] Date of Patent: *Dec. 28, 1999

[54] APPARATUS FOR CONTROL OF MULTIPLEXED VIDEO SYSTEM

[75] Inventors: Alan Neal Cooper; David William Bauerle, both of Coppell; Matthew John Fritz, Dallas, all of Tex.

[73] Assignee: Ultrak, Inc., Lewisville, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/702,913

[22] Filed: Aug. 26, 1996

[51] Int. Cl.$^6$ .................................................. H04N 5/268
[52] U.S. Cl. .............................. 348/705; 348/159; 348/8
[58] Field of Search ........................ 348/705, 706, 348/151, 153, 159, 15, 16, 6, 8; H04N 5/268, 7/18

[56] References Cited

U.S. PATENT DOCUMENTS

| | | | |
|---|---|---|---|
| 3,580,998 | 5/1971 | Hammond et al. | 178/6.8 |
| 3,811,008 | 5/1974 | Lee | 178/6.6 |
| 3,900,705 | 8/1975 | Richter | 178/6.8 |
| 4,037,250 | 7/1977 | McGahan et al. | 358/108 |
| 4,051,524 | 9/1977 | Baxter | 358/108 |
| 4,091,422 | 5/1978 | Amster | 358/210 |
| 4,218,709 | 8/1980 | Baxter et al. | 358/181 |
| 4,298,889 | 11/1981 | Burianek et al. | 358/148 |
| 4,337,481 | 6/1982 | Mick et al. | 348/154 |
| 4,511,886 | 4/1985 | Rodriquez | 348/154 |
| 4,517,593 | 5/1985 | Keller et al. | 358/107 |
| 4,577,344 | 3/1986 | Warren et al. | 382/1 |
| 4,603,352 | 7/1986 | Kaneta et al. | 358/148 |
| 4,700,230 | 10/1987 | Pshtissky | 358/181 |
| 4,814,869 | 3/1989 | Oliver, Jr. | 358/108 |
| 4,920,371 | 4/1990 | Kaneko | 354/410 |
| 4,943,854 | 7/1990 | Shiota et al. | 358/108 |
| 4,943,864 | 7/1990 | Elberbaum | 358/108 |
| 4,945,417 | 7/1990 | Elberbaum | 358/210 |
| 4,949,181 | 8/1990 | Elberbaum | 358/210 |
| 4,954,886 | 9/1990 | Elberbaum | 358/86 |
| 4,977,449 | 12/1990 | Morgan | 358/86 |
| 4,989,085 | 1/1991 | Elberbaum | 358/108 |
| 5,001,473 | 3/1991 | Ritter et al. | 340/825.52 |
| 5,226,066 | 7/1993 | Barr | 378/99 |
| 5,237,408 | 8/1993 | Blum et al. | 348/12 |

(List continued on next page.)

FOREIGN PATENT DOCUMENTS

| | | |
|---|---|---|
| 2704379-A1 | 4/1993 | France. |
| 357079781 | 5/1982 | Japan. |
| 2109198 | 4/1990 | Japan. |
| 4192780 | 7/1992 | Japan. |
| 4287488 | 10/1992 | Japan. |
| 406197344 | 7/1994 | Japan. |

OTHER PUBLICATIONS

Elbex, Ltd., Catalog, Serial Video Series, Oct. 1995.
Elbex, Ltd., Catalog, Framelock Series, Oct. 1993.
Elbex, Ltd., What Is I–D–Code?, Nov. 1995.

*Primary Examiner*—Sherrie Hsia
*Attorney, Agent, or Firm*—Jenkens & Gilchrist, P.C.

[57] ABSTRACT

A display and control module sends synchronization signals and camera display codes to a loop multiplexer module and a home run multiplexer module. The loop multiplexer module has a plurality of cameras coupled to a loop multiplexer unit. The loop multiplexer unit controls the synchronization and selection of video from the cameras for sending to the display and control module. The home run multiplexer includes a home run multiplexer unit coupled to a plurality of coaxial cables, each coaxial cable having at least one video camera thereon. The home run multiplexer unit receives the synchronization and control signals from the display and control module and uses those signals for synchronizing and selecting video images from one of the plurality of cameras for sending to the display and control module. The display and control module uses the video signals from the loop multiplexer module and the home run multiplexer module to display on a display.

7 Claims, 6 Drawing Sheets

U.S. PATENT DOCUMENTS

| | | | |
|---|---|---|---|
| 5,239,376 | 8/1993 | Dittmann et al. | 358/101 |
| 5,243,425 | 9/1993 | Thompson | 358/148 |
| 5,249,051 | 9/1993 | Elberbaum et al. | 358/148 |
| 5,262,869 | 11/1993 | Hong | 348/211 |
| 5,264,929 | 11/1993 | Yamaguchi | 358/108 |
| 5,267,039 | 11/1993 | Elberbaum | 358/146 |
| 5,274,450 | 12/1993 | Elberbaum | 358/149 |
| 5,283,649 | 2/1994 | Elberbaum et al. | 348/500 |
| 5,293,231 | 3/1994 | Elberbaum et al. | 348/521 |
| 5,335,014 | 8/1994 | Elberbaum | 348/159 |
| 5,361,096 | 11/1994 | Ohki et al. | 348/387 |
| 5,371,535 | 12/1994 | Takizawa | 348/15 |
| 5,389,968 | 2/1995 | Koyanagi et al. | 348/211 |
| 5,438,362 | 8/1995 | Tabuchi | 348/211 |
| 5,479,206 | 12/1995 | Ueno et al. | 348/211 |
| 5,508,737 | 4/1996 | Lang | 348/159 |
| 5,550,584 | 8/1996 | Yamada | 348/153 |
| 5,579,060 | 11/1996 | Elberbaum | 348/705 |
| 5,583,796 | 12/1996 | Reese | 348/159 |
| 5,621,729 | 4/1997 | Johnson et al. | 348/13 |
| 5,675,738 | 10/1997 | Suzuki et al. | 348/13 |
| 5,696,553 | 12/1997 | D'Alfonson et al. | 348/211 |

APPARATUS FOR CONTROL OF MULTIPLEXED VIDEO SYSTEM

BACKGROUND

The present invention relates to multiplexing video signals, and more particularly, to the control of multiplexing video signals.

The use of multiple cameras in a surveillance system has necessitated the use of multiplexing those cameras into a single video stream for recording or display. As the number of multiplexed cameras in a system grows, the difficulty of multiplexing the video images from those cameras into a single video stream is complicated. After a multiplexed system has a certain number of cameras, the cameras must be divided into multiple multiplexed systems. However, these multiple multiplexed systems operate independently. Therefore, there is a need for methods and devices that control a plurality of multiplexed systems.

SUMMARY OF THE INVENTION

In accordance with the present invention, a modular multiplexing system comprises a display and control module having a display and control unit connected to at least one display. In one embodiment, the display and control unit receives video signals from a video playback unit and processes those signals for display. In another embodiment, the display and control unit sends slave control signals and synchronization signals to at least one slave module, and receives video signals back from the at least one slave module. The slave module includes a plurality of cameras coupled to a control unit which selects video signals from one of the plurality of video cameras for transmission to the display and control unit based upon the slave control signal sent to the slave control unit from the display and control unit.

In one embodiment, the slave module comprises a loop multiplexing module that has a loop multiplexer unit that receives the slave control signals and the synchronization signals from the display and control unit. The loop multiplexer uses the slave control signals and the synchronization signals to generate timing and control codes for the cameras. The loop multiplexer unit sends timing and control codes out on a first end of a coaxial loop. The plurality of cameras are connected to the coaxial loop and receive the timing and control codes from the loop multiplexer unit. The one of the plurality of cameras that correspond to the camera code inserted by the loop multiplexer unit will insert a video image signal on the coaxial loop. The loop multiplexer unit receives the composite video on a second end of the coaxial loop, and sends the composite video to the display and control unit for display in the display and control module.

In another embodiment, the slave module comprises a home run multiplexer loop having a home run multiplexer unit coupled to a plurality of coaxial cables, each coaxial cable having at least one video camera thereon.

The home run multiplexer unit receives the slave control signals and the synchronization signals from the display and control unit. The home run multiplexer unit uses the slave control signals and the synchronization signals to generate timing and control codes for the cameras. The home run multiplexer unit sends timing and control code signals in parallel onto each of the coaxial loops. The one of the plurality of cameras that corresponds to the camera code inserted by the home run multiplexer unit onto the coaxial cables, inserts a video image onto the associated coaxial cable upon receiving the corresponding camera code from the home run multiplexer unit. The home run multiplexer unit receives the composite video image signal from the coaxial cable and transmits the composite video signal to the display and control unit for display in the display and control module.

BRIEF DESCRIPTION OF THE DRAWINGS

These and other features, aspects, and advantages of the present invention will become better understood with regard to the following detailed description, appended claims and appended drawings, where:

DETAILED DESCRIPTION

Figure 1:
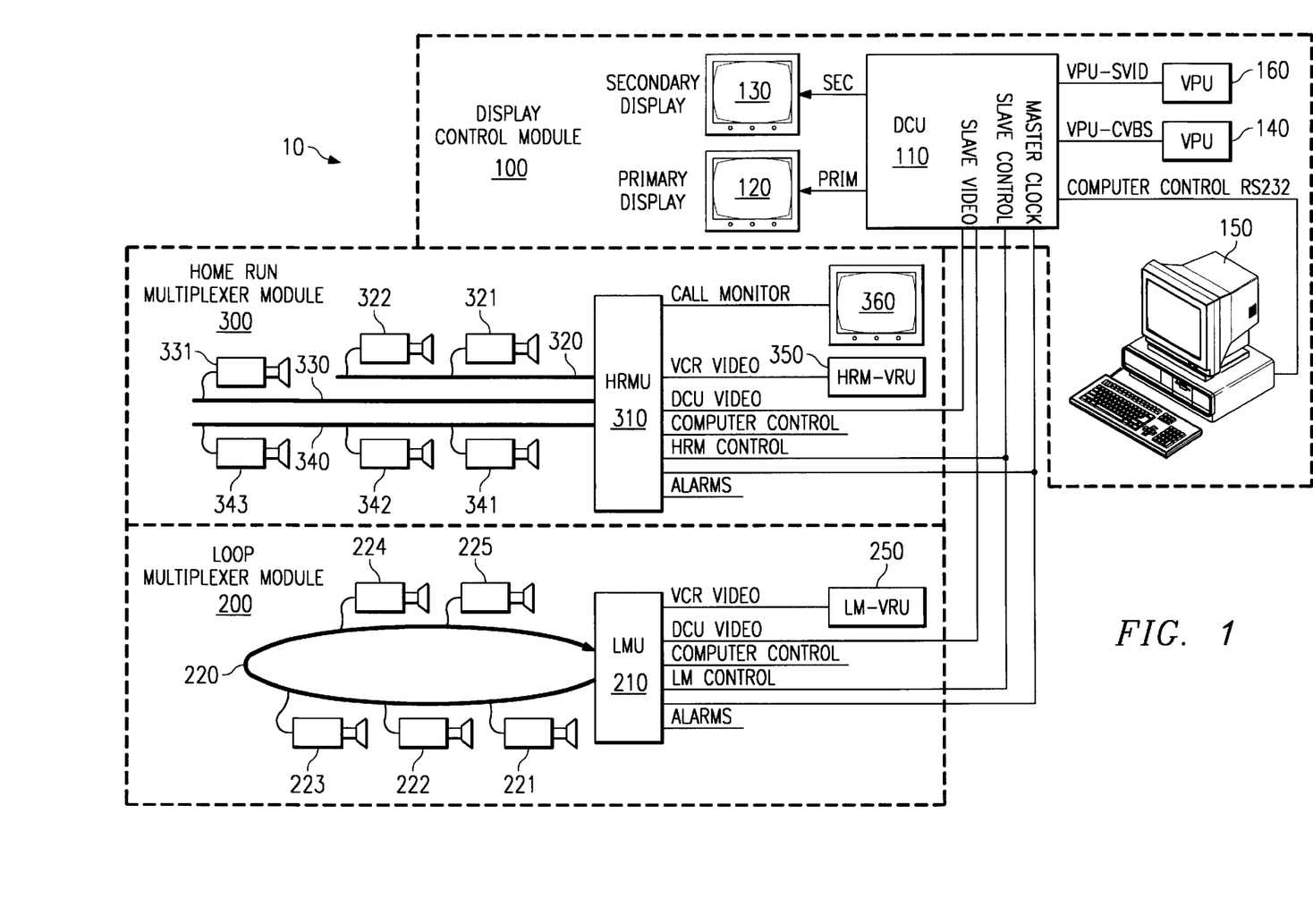
FIG. 1 is a block diagram of a modular multiplexing system.

Referring now to the figures, there is shown one embodiment of the present invention illustrated in a modular multiplexing system 10 for recording and viewing a large number of cameras from a single location. The modular multiplexing system 10 comprises three basic modules: a display and control (DC) module 100, a loop multiplexer (LM) module 200, and, a home run multiplexer (HRM) module 300. The LM module 200 allows multiple cameras to be connected to a single loop of coaxial cable for recording onto a single video recorder, or for inputting into the DC module 100 for display by the DC module 100. The HRM module 300 is similar to the LM module 200 in that it synchronizes and multiplexes video from many cameras into a single video stream, but differs in that the cameras on the HRM module 300 are connected by multiple nonlooping cable runs. The LM module 200 and the HRM module 300 are slave modules that the DC module 100 controls and displays.

The DC module 100 includes a display and control unit (DCU) 110, a primary display 120, a secondary display 130, a video playback unit (VPU-CVBS) 140, a computer 150, and a video playback unit (VPU-SVid) 160. The DCU 110 synchronizes all of the slave modules in the modular multiplexing system 10 and also provides one location from which all of the slave modules can be configured and controlled. The DCU 110 processes the multiplex video streams from a combination of up to eight slave modules, the VPU-CVBS 140, and the VPU-SVid 160, and generates video streams for display on the primary display 120 and/or the secondary display 130. The computer 150 can be used for configuring the system 10.

Figure 2A:
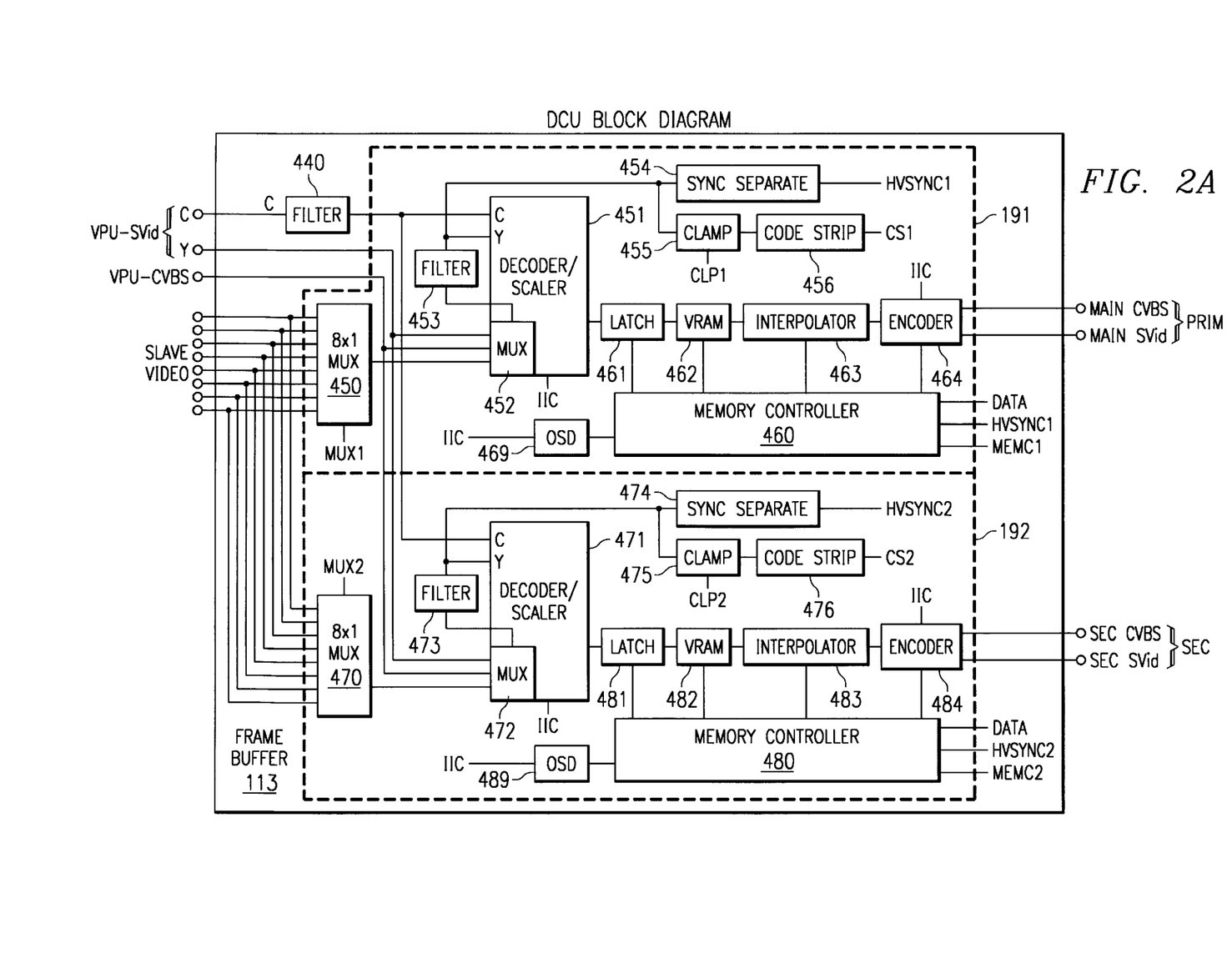
FIG. 2 is a block diagram of the display and control unit from the display and control module in FIG. 1.
Figure 2B:
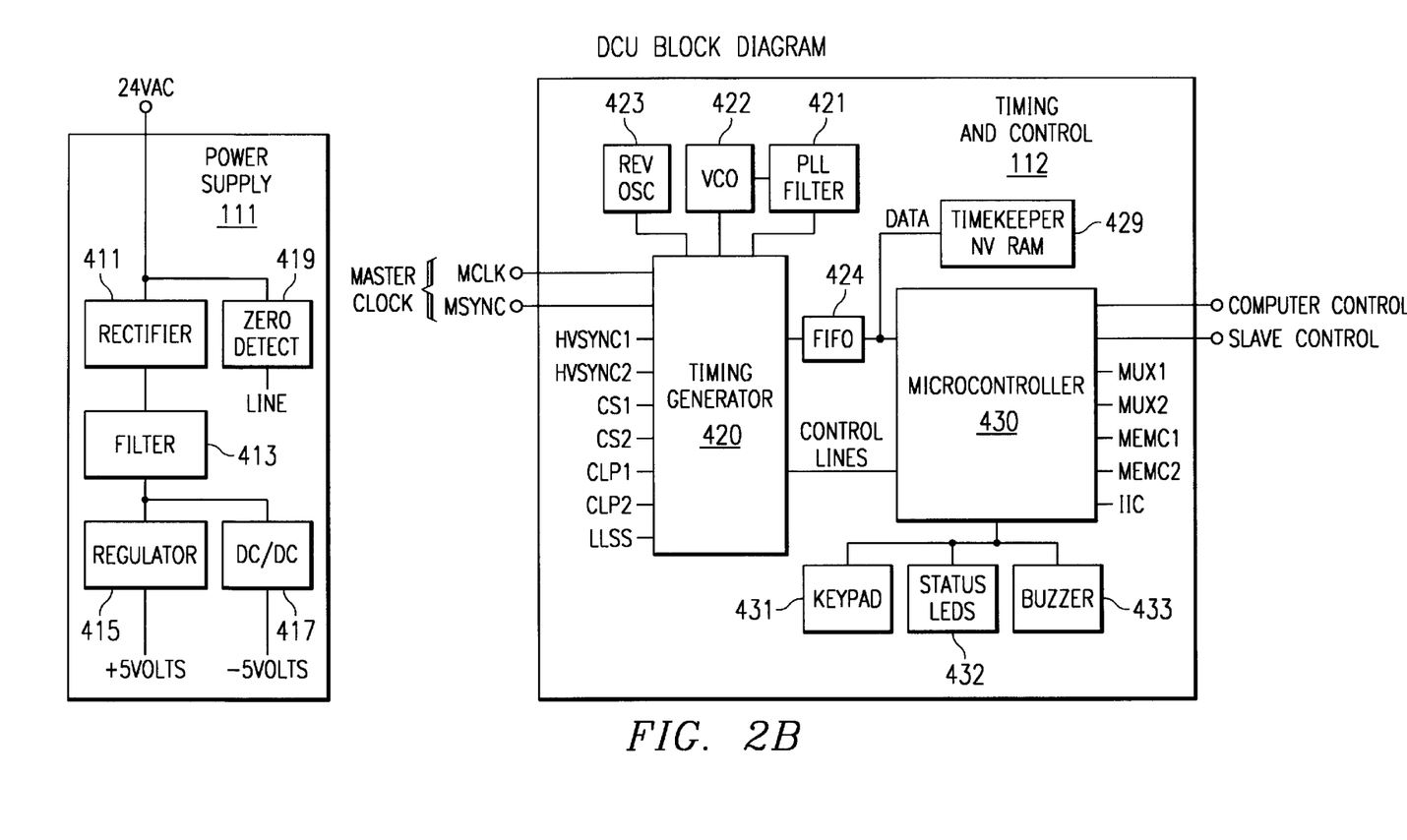

The DCU 110 can be divided into three major divisions: a power supply 111, a timing and control 112, and a frame buffer 113. The power supply 111 converts an AC power input, such as 24 VAC, to a +5 VDC and a −5 VDC supply as required by the other circuitry in the DCU 110. The power supply 111 is a standard power supply having a rectifier 411, a filter 413, a regulator 415, and a DC/DC converter/regulator 417, and has the addition of a line lock zero crossing detector 419. The line lock zero crossing detector 419 receives the input alternating current power of the DCU 110. The line lock zero crossing detector 419 generates a line lock synchronization signal (llss) that tracks the frequency and phase of the input power. The llss from the line lock zero crossing detector 419 is used by the DCU 110 for synchronization.

The timing and control 112 of the DCU 110 contains both the logic for generation of synchronization signals used by the frame buffer 113 and the slave units, and the microcontroller 430 that manages the entire modular multiplexing system 10. The timing and control 112 includes a timing generator 420, a phase lock loop filter (PLL) 421, a voltage controlled oscillator (VCO) 422, a reference oscillator 423, a first-in-first-out memory (FIFO) 424, a timekeeper NV RAM 429, a microcontroller 430, a keypad 431, status LEDs 432, and a buzzer 433.

The timing generator 420 of the timing and control 112 generates a time base which is utilized to generate a reference frame clock signal. The timing generator also has a phase comparitor that compares the reference frame clock with the llss signal from the zero detect 419 in the power supply 111 to determine if the phase of the llss signal is ahead or behind of the reference frame clock. The timing generator 420 sends a signal to the PLL filter 421 indicating the difference of the phase between the llss and the reference frame clock of the timing generator 420. The PLL filter 421 uses the phase difference information from the timing generator 420 to send a DC voltage signal to the VCO 422. The VCO 422 adjusts its clock output to the timing generator 420 based upon the DC voltage signal from the PLL filter 421. The timing generator 420 also uses the reference oscillator 423 to create an acceptance frequency window that the frequency of the llss must be within. If the frequency of the llss is not within the acceptance frequency window generated by the timing generator 420 based on the reference oscillator 423, the timing generator 420 hangs the phased difference information signal onto one end of the acceptance frequency window. The timing generator 420 also generates the MCLK signal and the MSYNC signal of the master clock based on the time base within the timing generator 420.

The timing generator 420 exchanges control codes with the microcontroller 430 over control lines. Data passing between the timing generator 420 and the microcontroller 430 passes through the FIFO filter 424 which acts as a data buffer. The timekeeper NV RAM 429 provides storage for configuration data during power out periods, including time and date. The microcontroller 430 controls the functions of the components in the DCU 110, the slave control codes for controlling the slave modules, and the interface with the computer control for user configuration. The keypad 431, status LEDs 432, and buzzer 433 provide the DCU interface that allows the operator to utilize the controls of the DCU 110.

The frame buffer 113 selects one of the streams of video from the slave modules, the VPU-CVBS 140, and/or the VPU-VSid 160, and processes the selected video stream for display on the primary display 120 and/or the secondary display 130. The frame buffer 113 includes an anti-aliasing filter 440, a DC multiplexer 450, 470, a decoder/scaler 451, 471, an anti-aliasing filter 453, 473, a synchronization separator 454, 474, a clamp 455, 475, a code stripper 456, 476, a memory controller 460, 480, a latch 461, 481, a VRAM 462, 482, an interpolator 463, 483, an encoder 464, 484, and an on-screen-display (OSD) 469, 489.

Signals from the VPU-CVBS 140 in the DC module 100 are received by the frame buffer 113. The luminance signals from the VPU-SVid 140 are received by the frame buffer 113. The chrominance signal of the VPU-SVid 160 pass through the anti-aliasing or band pass filter 440 and into the decoder/scaler 451, 471. Video signals from the slave modules are received in the DC multiplexer 450, 470. The DC multiplexer 450, 470 is an 8×1 multiplexer that selects the video signals from one of the slave modules for an output based upon a signal from the microcontroller 430 in the timing and control 112.

Signals from the VPU 140, the VPU 160 and the DC multiplexer 450 are received by a decoder scaler multiplexer 452 in the decoder scaler 451. The decoder scaler multiplexer 452 is a 3×1 multiplexer that selects video images from one of the VPU-CVBS 140, the VPU-SVid 160, or the DC multiplexer 450, based upon a control signal supplied to the decoder scaler 451 from the microcontroller 430 in the timing and control 112. The output of the decoder scaler multiplexer 452 is passed through the anti-aliasing filter 453 which is a band pass filter that limits the band width prior to digitizing. The video signal from the anti-aliasing filter 453 is returned to the input of the decoder scaler 451.

Signals from the VPU 140, the VPU 160 and the DC multiplexer 470 are received by a decoder scaler multiplexer 472 in the decoder scaler 471. The decoder scaler multiplexer 472 is a 3×1 multiplexer that selects video images from one of the VPU-CVBS 140, the VPU-SVid 160, or the DC multiplexer 470, based upon a control signal supplied to the decoder scaler 471 from the microcontroller 430 in the timing and control 112. The output of the decoder scaler multiplexer 472 is passed through the anti-aliasing filter 473 which is a band pass filter that limits the band width prior to digitizing. The video signal from the anti-aliasing filter 473 is returned to the input of the decoder scaler 471.

The video signals from the anti-aliasing filters 453 and 473 are also supplied respectively to the synchronization separators 454 and 474, and the clamps 455 and 475. The synchronization separators 454 and 474 strip the synchronization components of the composite video and sends those signals to the timing generator 420 of the timing and control 112 for synchronization during VPU playback. The clamps 455 and 475 change the DC component of the video for use by the code strippers 456 and 476. The code strippers 456 and 476 strip the data codes in the video from the clamps 455 and 475 and sends those data codes to the timing generator 420 in the timing and control 112 for transmission to, and use by, the microcontroller 430.

The decoder scaler 451, 471 digitizes the video received from the anti-aliasing filters 453, 473 and separates the video signals into luminance signals and chrominance signals for storage. The decoder scaler 451, 471 also scales the number of vertical and horizontal pictures into a predetermined number based on VRAM 462 storage capability. The digitized and scaled video from the decoder scaler 451, 471 is held by the latch 461, 481 while the VRAM 462, 482 stores the video data. In one preferred embodiment, the VRAM 462, 482 has sufficient memory to store at least one frame of video. The interpolator 463, 483 is a video scaler that changes the horizontal pixels in a video to a predetermined number. The encoder 464, 484 converts the digital video signal to an analog signal for output to the primary display 120 and the secondary display 130. The memory controller 460, 480 provides control of the processing of the video as it passes from the latch 461, 481 through the encoder 464, 484. The OSD 469, 489 generates characters representing information such as time and date, which the microcontroller 430 directs the insertion of into the video being processed by the frame buffer 113.

In one embodiment, the DC multiplexer 450, 470, the decoder/scaler 451, 471, the anti-aliasing filter 453, 473, the synchronization separator 454, 474, the clamp 455, 475, the code stripper 456, 476, the memory controller 460, 480, the latch 461, 481, the VRAM 462, 482, the interpolator 463, 483, the encoder 464, 484, and the on-screen-display (OSD)

469, 489 are mounted to replacable cards 191, 192, respectively, for modular insertion in the DCU 110. In another embodiment, the frame buffer 113 will accept a plurality of these cards permitting additional monitors or video recording units to be connected to the frame buffer 113.

The LM module 200 includes a loop multiplexer unit (LMU) 210, a camera loop line 220 connected at both ends to the LMU 210, a plurality of cameras 221–225 connected to the camera loop line 220, and a video recording unit (LM-VRU) 250 connected to the LMU 210. The LMU 210 synchronizes the cameras 221–225 on the camera loop line 220. The LMU 210 also controls the insertion of video signals on the camera loop line 220 by the cameras 221–225, and multiplexes those images for output to the LM-VRU 250 and/or the DC module 100. In one embodiment, the LMU 210 synchronizes the cameras 221–225 and controls the insertion of video signals on the camera loop line 220 according to the teaching in U.S. patent application Ser. No. 08/501,261, entitled "VIDEO MULTIPLEXER", filed on Jul. 11, 1995, assigned to the same Assignee of the present invention, which is hereby incorporated in its entirety herein by reference thereto.

When the LM module 200 is connected to the DC module 100, the LMU 210 receives the slave control and master clock signals from the DCU 110 of the DC module 100. The LMU 210 uses the master clock signals from the DCU 110 to synchronize the cameras 221–225. The LMU 210 uses the slave control signals from the DCU 110 to control the video images from cameras 221–225 for output to the DC module 100 or the LM-VRU 250. When the LM module 200 is not connected to the DC module 100, the LM module 200 will operate on a stand alone basis and record the multiplexed video from cameras 221–225 on the LM-VRU 250.

Figure 3:
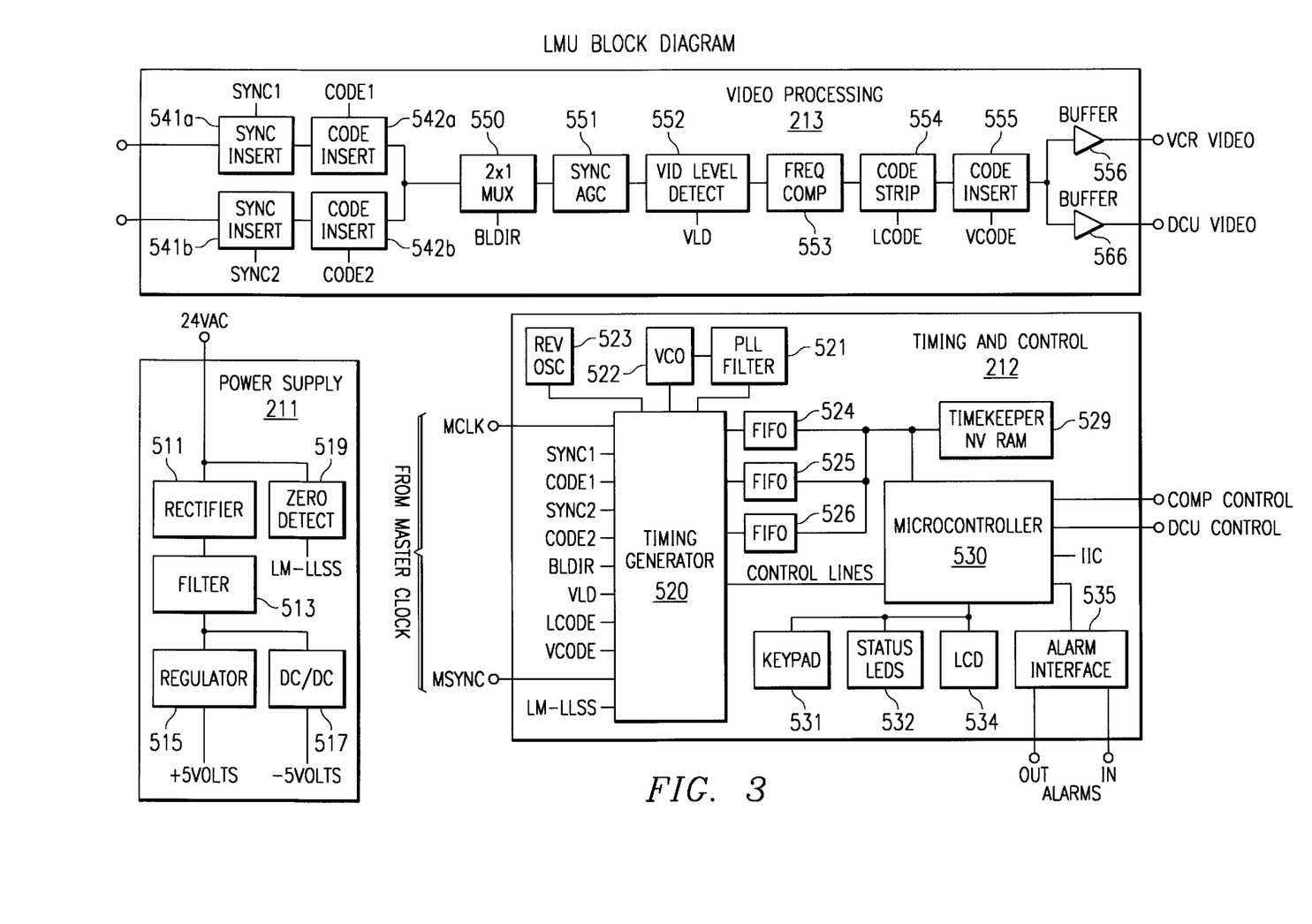
FIG. 3 is a block diagram of the loop multiplexer unit from the loop multiplexer module in FIG. 1.

The LMU 210 can be divided into three major divisions: a power supply 211, a timing and control 212, and a video processor 213. The power supply 211 converts an AC power input, such as 24 VAC, into a +5 VDC and a −5 VDC supply as required by the other circuitry in the LMU 210. Similar to the power supply 111 of the DCU 110, the power supply 211 of the LMU 210 includes a rectifier 511, a filter 513, a regulator 515, a DC/DC converter/regulator 517, and a line lock zero crossing detector 519. The line lock zero crossing detector generates a loop module line lock signal (LM-llss) that tracks the frequency and phase of the input power.

The timing and control 212 of the LMU 210 contains both the logic for generation of video synchronization signals and the microcontroller that manages the entire LM module 200. The timing and control 212 contains a timing generator 520, a phase lock loop filter (PLL) 521, a voltage controlled oscillator (VCO) 522, a reference oscillator 523, a first-in-first-out memory (FIFO) 524–526, a timekeeper NV RAM 529, a microcontroller 530, a keypad 531, status LEDs 532, a liquid crystal display (LCD) 534, and alarms 535.

When the LM module 200 is connected to the DC module 100, the timing generator 520 of the timing and control 212 uses the MCLK and the MSYNC signals of the master clock from the DCU 110 to generate the time base and reference frame clock for the components of the LMU 210. When the LM module 200 is operated in a stand alone mode, the timing generator 520 uses the PLL filter 521, VCO 522, reference oscillator 523 and LM-llss signal to generate the timing signals used by the LM module 200 in the same manner that the timing generator 420 in the timing and control 112 of the DCU 110 uses the PLL filter 421, VCO 422, reference oscillator 423, and llss signal to generate the timing signals used by the DC module 100.

The timing generator 520 of the timing and control 212 exchanges control codes with the microcontroller 530 over control lines. Data is exchanged between the timing generator 520 and the microcontroller 530 via the FIFO's 524–526, which act as data buffers. The timekeeper NV RAM 529 provides storage for configuration of data during time periods that power is not supplied to the LMU 210. The microcontroller 530 generates the control signals that control the operation of the LMU 210, receives the control signals from the slave control output of the DCU 110, and provides an interface for the computer control allowing configuration of the LM module 200. The microcontroller 530 also interfaces with a user through the keypad 531, status LEDs 532, and LCD 234.

A plurality of alarms can be received at the input of the alarm interface 535. The microcontroller 530 monitors the alarm status and uses the information for decisions on controlling the LM module 200. The microcontroller 530 can also send an alarm activated signal through the output of the alarm interface 535.

The video processor 213 of the LMU 210 is responsible for the interface to the camera loop line 220 and for processing the video from the camera loop line 220 for output to the LM-VRU 250 and/or the DC Module 100. The LMU 210 interfaces with the camera loop line 220 by inserting synchronization signals on the camera loop line 220 that are used by the cameras 221–225 for synchronization, by inserting data codes on the camera loop line 220 that are used to command each of the cameras 221–225 to insert video signals onto the camera loop line 220, and by receiving video signals from the camera loop line 220 that are processed for output from the video processor 213. The video processor 213 includes synchronization inserters 541a–b, code inserters 542a–b, a video processor multiplexer 550, a sync AGC 551, a video level detect 552, a frequency compensator 553, a code stripper 554, a code inserter 555, a buffer 556, and a buffer 566.

The interface to the camera loop line 220 by the LMU 210 is accomplished by the synchronization inserters 541a–b, the code inserters 542a–b, and the video processor multiplexer 550 of the video processor 213. The synchronization inserters 541a–b generate the synchronization signals that are inserted onto the camera loop line 220 for use by the cameras 221–225 for synchronization. In one embodiment, the synchronization signals inserted on camera loop line 220 by the synchronization inserters 541a–b are also used as the composite video synchronization pulse of the composite video. The code inserters 542a–b generate the data communication codes that are inserted onto the camera loop line 220 for use by the cameras 221–225. The data communication codes inserted by the code inserter 542a–b are used by the cameras 221–225 for activation of a particular one of the cameras corresponding to the particular data code. The video processor multiplexer 550 is a 2×1 multiplexer that receives returning video from either side of the camera loop line 220. The video processor multiplexer 550 selects which side of the camera loop line 220 is an output from the video processor multiplexer 550 based upon the code being received from the timing generator 520 in the timing a–d control 212. In one embodiment, the decision of which side of the camera loop line 220 is an output of the video processor multiplexer 550 in the same manner and based on the same criteria as the video signal routing system for video signals described in the co-pending application Ser. No. 08/702912 filed on Aug. 26,1996, U.S. Pat. No. 5,825,411, entitled "VIDEO SIGNAL ROUTING SYSTEM", assigned to the assignee of the present invention, which is hereby incorporated in its entirety herein by reference thereto.

The processing of video for output by the LMU 210 to the LM-VRU 250 and/or the DC module 100 is accomplished by the sync AGC 551, the video level detect 552, the frequency compensator 553, the code stripper 554, the code inserter 555, the buffer 556, and the buffer 566 of the video processor 213. The sync AGC 551 scales up or down the video level such that the synchronization signal level is at a nominal value. The scaling of the video level by the sync AGC 550 is necessary to compensate for losses that result from transmission of the sync signal around a long loop of cable. The video level detect 552 determines video losses for each of the individual cameras 221–225 by comparing a referenced signal generated by each camera to a known level. The comparison information of the video level detect 552 is transmitted back to each of the individual cameras 221–225, where it is used by the individual cameras 221–225 to adjust the individual camera gain. The frequency compensator 553 makes adjustments for frequency losses.

In addition to data communication codes inserted at the source end of the camera loop line 220 by the code inserters 542a–, the returning video will contain data communication codes inserted by the cameras 221–225. In one embodiment, the cameras 221–225 will insert data codes into the video signal according to the teaching in U.S. patent application Ser. No. 08/501,261, entitled "VIDEO MULTIPLEXER", filed on Jul. 11, 1995, assigned to the same Assignee of the present invention, which is hereby incorporated in its entirety herein by reference thereto. The code stripper 554 strips the codes generated by the cameras 221–225 off of the returning video and makes those codes available to the other parts of the video processor 213. Additional data communication codes, such as time, date, or camera title, are inserted onto the video by the code inserter 555 before the video is output to the LM-VRU 250 and/or the DC module 100. The video signal from the video processor 213 passes through the buffer 556 before being output to the LM-VRU 250, and through the buffer 566 prior to being output to the DC module 100.

The HRM module 300 is similar to the LM module 200 in that it synchronizes and multiplexes video streams from many cameras into a video stream ready for recording or display, but differs in that its cameras are connected by multiple non-looping cable runs. Each of the cable runs can support multiple cameras. While this configuration is more expensive to install, it provides a higher display rate performance and can support the use of a call monitor. The HRM module 300 includes a home run multiplexer unit (HRMU) 310, a video recording unit (HRM-VRU) 350 connected to the HRMU 310, and a call monitor 360 connected to the HRMU 310. The HRMU 310 synchronizes and controls the cameras 321–322, 331, and 341–343, on the cable runs 320, 330, and 340, respectively. The HRMU 310 also controls the insertion of video signals on the camera line runs 320, 330, and 340, by the cameras 321–322, 331, and 341–343, and multiplexes those images for output to HRM-VRU 350 and/or the DC module 100. In one embodiment, the HRMU 310 synchronizes the cameras 321–322, 331, 341–343, according to the teaching in U.S. patent application Ser. No. 08/501,261, entitled "VIDEO MULTIPLEXER", filed on Jul. 11, 1995, assigned to the same Assignee of the present invention, which is hereby incorporated in its entirety herein by reference thereto.

When the HRM module 300 is connected with a DC module 100, the HRMU 310 receives the slave control and master clock signals from the DCU 110 of the DC module 100. The HRMU 310 uses the master clock signals from the DCU 110 to synchronize the cameras 321–322, 331, and 341–343. The HRMU 310 uses the slave control signals from the DCU 110 to control the video images from cameras 321–322, 331, and 341–343 for output to the HRM-VRU 350 and/or the DC module 100. When the HRM module 300 is not connected to the DC module 100, the HRM module 300 will operate on a stand alone basis and record the multiplexed video from the cameras 321–322, 331, and 341–343 on the HRM-VRU 350.

Figure 4A:
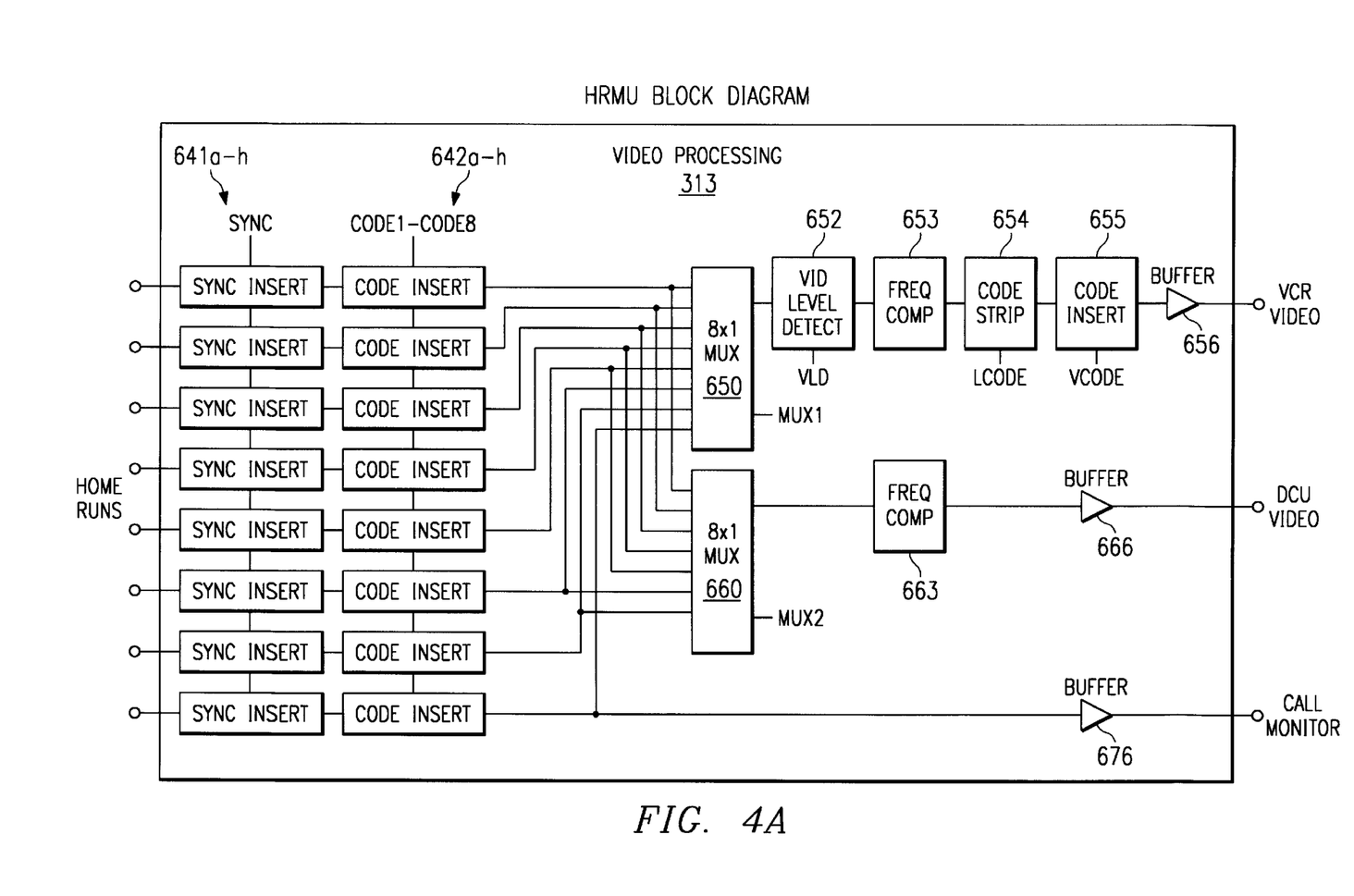
FIG. 4 is a block diagram of the home run multiplexer unit in the home run multiplexer module in FIG. 1.
Figure 4B:
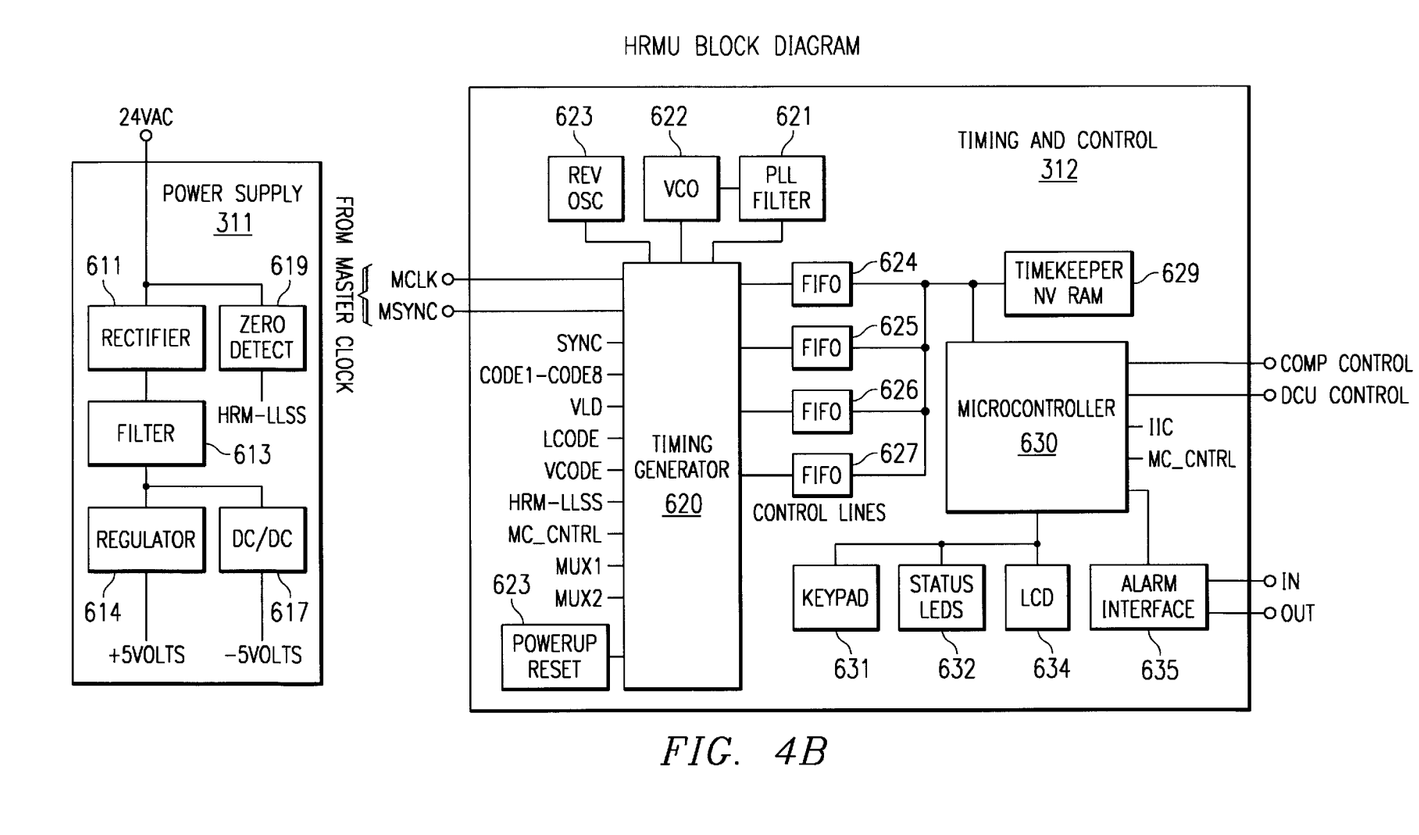

The HRMU 310 can be divided into three major division: a power supply 311, a timing and control 312, and a video processor 313. The power supply 311 converts on AC power supply, such as 24 VAC, into a +5 VDC and a −5 VDC supply as required by the other circuitry in the HRMU 310. The power supply 311 is similar to the power supply 111 of the DCU 110 and the power supply 211 of the LMU 210. The power supply 311 includes a rectifier 611, a filter 613, a regulator 615, a DC/DC converter/regulator 617, and a line lock zero detector 619. The line lock zero crossing detector 619 of the power supply 311 generates a HRM line lock sync signal (HRM-llss) that tracks the frequency and phase of the input power.

The timing and control 312 of the HRMU 310 contains both the logic for generation of video synchronization signals and the microcontroller that manages the entire HRM module 300. The timing and control 312 includes a timing generator 620, a phase lock loop filter (PLL) 621, a voltage controlled oscillator (VCO) 622, a reference oscillator 623, a first-in-first-out memories (FIFO) 624–627, a timekeeper MV RAM 629, a microcontroller 630, a keypad 631, status LEDs 632, a liquid crystal display (LCD) 634, and alarm 635.

When the HRM module 300 is connected to the DC module 100, the timing generator 620 of the timing and control 312 uses the MCLK and the MSYNC signals of the master clock from the DCU 110 to generate the time base and reference frame clock for the components of the HRMU 310. When the HRM module 300 is operated in a stand alone mode, the timing generator 620 uses the PLL filter 621, VCO 622, reference oscillator 623 and HRM-llss signal to generate the timing signals used by the HRM module 300 in the same manner that the timing generator 420 in the timing and control 112 of the DCU 110 uses the PLL filter 421, VCO 422, reference oscillator 423, and llss signal to generate the timing signals used by the DC module 100.

The timing generator 620 of the timing and control 312 exchanges control codes with the microcontroller 530 over control lines. Data is exchanged between the timing generator 620 and the microcontroller 630 via the FIFO's 624–627, which act as data buffers. The timekeeper NV RAM 629 provides storage for configuration of data during time periods that power is not supplied to the HRMU 310. The microcontroller 630 generates the control signals that control the operation of the HRMU 310, receives the control signals from the slave control output of the DCU 110, and provides an interface for the computer control allowing configuration of the HRM module 300. The microcontroller 630 also interfaces with a user through the keypad 631, status LEDs 632, and LCD 634.

A plurality of alarms can be received at the input of the alarm interface 635. The microcontroller 630 monitors the alarm status and uses the information for decisions on controlling the HRM module 300. The microcontroller 630 can also send an alarm activated signal through the output of the alarm interface 635.

The video processor 313 of the HRMU 310 contains all of the components necessary to insert camera synchronization signals onto all of the cable runs, insert data communication codes to each of the runs separately, to multiplex any of the cable runs to either the HRM-VRU 350 or the DC module 100, and to process that video in between. The video processor 313 includes synchronization inserters 641*a–h*, code inserters 642*a–h*, HRM-VRU multiplexer 650, video level detect 652, frequency compensator 653, code stripper 654, code inserter 655, buffer 656, HRM-DC multiplexer 660, frequency compensator 663, buffer 666, and buffer 676.

The synchronization inserters 641*a–h* of insert synchronization signals in parallel onto all of the cable runs 320, 330, and 340, for use by the cameras 321–322, 331, and 341–343, respectively, on those cable runs. The code inserters 642*a–h* insert data communication codes onto the cable runs 320, 330, and 340, and can apply the data communications to each run separately, and two different data packets can be applied to two different cable runs simultaneously. This structure allows for two cameras on two different cable runs to be addressed (activated) and controlled simultaneously such that one can be routed to the HRM-VRU 350, and one can be routed to the DC module 100. In one embodiment, the cameras 321–322, 331, 341–343 and the HRMU 310 compensates for video signal delays that occur as a result of transmission over the cable runs 320, 330 and 3340 in the same manner as disclosed in the co-pending application Ser. No. 08/702,915 filed on Aug. 26, 1996, entitled "PHASE COMPENSATION FOR VIDEO CAMERAS", assigned to the assignee of the present invention, which is hereby incorporated in its entirety herein be reference thereto.

The HRM-VRU multiplexer 650 in the video processor 313 receives the returning video from cable runs 320, 330, and 340. The HRM-VRU multiplexer 650 is an 8×1 multiplexer that selects which one of the camera runs is an output from the HRM-VRU multiplexer 650 based upon a command signal sent to the HRM-VRU multiplexer 650 from the microcontroller 630 in the timing and control 312, via the timing generator 620.

The video streams at the output of the HRM-VRU multiplexer 650 require some processing before they can be output to the HRM-VRU 350. The processing change of the video stream by the video processor 313 for output to the HRM-VRU 350 is the same as in the video processor 213 of the LMU 210, with the exception that the sync AGC is not required due to the fact that the sync signal does not have to travel through any length of cable. The video level detect 652 receives video signals from the VRU multiplexer 650 and determines the video losses for each individual camera 331–341, 341–343, by comparing a reference signal generated by each camera to a known level. This information is transmitted back to each individual camera by the video level detect 652 where it is used by the individual cameras to adjust the camera gain. The frequency compensator 653 makes camera gain adjustments that are necessary to compensate for losses that result from transmission of video fields down long cable runs. Each camera must have a different gain setting because each camera will be connected to the video processor 313 by a different length of cable.

In addition to the data communication codes inserted at the source end of the cable runs 320, 330, and 340 by the code inserters 642*a–h* of the video processor 313, the returning video will contain data communication codes inserted by the individual cameras 321–322, 331, and 341–343. In one embodiment, the cameras 321–322, 331, and 341–343 will insert data codes into the video signal according to the teaching in U.S. patent application Ser. No. 08/501,261, entitled "VIDEO MULTIPLEXER", filed on Jul. 11, 1995, assigned to the same Assignee of the present invention, which is hereby incorporated in its entirety herein by reference thereto. The code stripper 654 strips these individual camera codes off of the video and makes them available to the other parts of the video processor 313. Additional data communication codes are inserted into the video by the code inserter 655 before it is output to the HRM-VRU 350. The video of the video processor 315 passes through the buffer 656 prior to being output to the HRM-VRU 350.

The HRM-DC multiplexer 660 also receives returning video from cable runs 320, 330, and 340. The HRM-DC multiplexer is an 8×1 multiplexer that selects which one of the camera runs 320, 330, or 340 is used as an output from the HRM-DC multiplexer 660 to the DC module 100 based upon a control from the microcontroller 630 in the timing and control 312. The video stream at the output of the HRM-DC multiplexer 660 requires only a frequency compensation by the frequency compensator 663 before it can be output to the DC module 100. The frequency compensator 663 makes camera gain adjustments for frequency losses in the video received from the DC multiplexer 660 for each individual camera. The video from the frequency compensator 663 passes through the buffer 666 prior to being output to the DC module 100.

The call monitor 360 is supported by the buffer 676 being directly connected to the camera line run 320, 330, or 340 that the call monitor 360 will monitor. In one embodiment, the call monitor is selectably connected to any one of the cable runs 320, 330 and 340 by a multiplexer based upon a control from the microcontroller 630 in the timing and control 312.

The DC module 100 is responsible for ensuring that the cameras for display are activated, and that the signals from the display camera are routed to the appropriate display 120 and/or 130. The DC module 100 accomplishes this by sending the slave modules a camera display command instructing the slave modules to insert a particular display camera into the camera sequence, and routing that field or fields to the appropriate display 120 and/or 130. The DC module 100 uses four display stacks to generate display the camera commands. Each display stack is a sequential list of cameras from a slave module that are to be displayed. If the total number of slaves modules is greater than four, each stack will have up to two slave modules assigned to it. The display camera command is selected by cycling through the four stacks and incrementing through the cameras in those stacks. Each video field or phase, a camera is selected from the next stack. The camera selected each phase is the camera one increment after the last camera selected in the same stack. If one of the display stacks have no camera, then no display will be commanded by the DC module 100 during that particular phase or field. The maximum display camera update rate for any slave module is one in four phases or fields.

The control unit (LMU or HRMU) of each slave module is responsible for determining which camera in a corresponding slave module will be activated next. This determination is made using three stacks. The first stack is the control command stack which holds the number of the camera commanded by the DC module 100, if present, that the slave module is to send images from to the DC module 100 for display. The second stack is the alarm camera stack which holds the camera numbers of all cameras that are associated with a particular alarm in an alarm condition. The third stack is an "all cameras" stack that holds the list of all cameras detected by the slave module.

The control command stack is a stack of only one camera number, that camera number being the camera code sent to the slave module by the DC module 100. If a camera number is present in the control command stack, the slave module will retrieve the image for the camera commanded by the DC module 100 before turning to any other camera. If no display camera is located in the control command stack, the slave module will look to see if a camera number exists in the alarm camera stack. If a camera number exists in the alarm camera stack, the slave module will alternate between the cameras in the alarm stack and the cameras in the all-cameras stack, selecting a camera for each stack that is the camera immediately after the camera number previously selected in the respective stack. If no camera number exists in the alarm camera stack or the camera command stack, the slave module will cycle through the cameras in the all camera stack by selecting a camera from the module camera stack which is the camera immediately after the camera number previously selected in the all camera stack.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for the control of video signal multiplexing, said system comprising:

a slave module having a plurality of cameras coupled to a slave control unit for obtaining video signals from one of said plurality of cameras for output therefrom;

a master control module having a monitor and a master control unit for receiving the video signals from the slave control unit and transmitting the video signals to said monitor and for sending a camera selection signal to said slave control unit that corresponds to one of said plurality of cameras; and wherein said slave control unit determines which one of said plurality of cameras to obtain the video signals from by selecting in a predetermined order one of said plurality of cameras for output from a list of said plurality of cameras and obtaining the video signals from the selected one of said plurality of cameras for output until said master control unit sends the camera selection signal to said slave control unit whereupon said slave control unit obtains the video signals from the camera corresponding to the camera selection signal.

2. The system of claim 1, wherein each of said plurality of cameras in said slave module are associated with a different camera code and transmits a video signal upon receiving the associated camera code; and wherein said slave control unit obtains said video signals from said plurality of cameras by transmitting the camera code associated with a particular one of said plurality of cameras that the video signals are to be obtained from to said plurality of cameras, and receiving the video signals from the particular one of said plurality of cameras that the video signals are to be obtained from in response thereto.

3. The system of claim 2, wherein said plurality of cameras are connected to a loop of cable having a first end and a second end, and wherein said slave control unit inserts the camera code onto the first end of said loop of cable for transmission to said plurality of cameras, and wherein said slave control unit receives the video signals from said plurality of cameras at the second end of said loop of cable.

4. The system of claim 1, wherein said slave module is a loop module.

5. The system of claim 1, wherein said slave module is a home run module.

6. The system of claim 1, wherein said slave control unit transmits a slave synchronization signal to said plurality of cameras and said plurality of cameras synchronize to said slave synchronization signal.

7. The system of claim 6, wherein said master control unit transmits a master synchronization signal to said slave control unit and said slave control unit synchronizes said slave synchronization signal to said master synchronization signal.

* * * * *